United States Patent [19]

Hopper

[11] 4,270,891

[45] Jun. 2, 1981

[54] TAKE-OFF APPARATUS FOR FORMED TUBULAR PLASTIC FILM

[76] Inventor: Stephen M. Hopper, 7290 Starlawn Rd., Perrysburg, Ohio 43551

[21] Appl. No.: 67,049

[22] Filed: Aug. 16, 1979

[51] Int. Cl.³ ............................................... B29F 3/00
[52] U.S. Cl. .................................. 425/296; 425/302.1; 425/308; 425/315; 425/316; 425/326.1
[58] Field of Search ...................... 425/296, 302.1, 308, 425/315, 316, 326.1

[56] References Cited

U.S. PATENT DOCUMENTS

| | | | |
|---|---|---|---|
| 2,848,747 | 8/1958 | Dixon | 425/315 |
| 3,160,918 | 12/1964 | Berggren et al. | 425/308 |
| 3,291,876 | 12/1966 | Justus | 425/302.1 |
| 3,305,615 | 2/1967 | McGregor | 264/145 |
| 3,342,657 | 9/1967 | Dyer | 264/146 |
| 3,557,268 | 1/1971 | Beretta et al. | 264/146 |
| 3,716,322 | 2/1973 | Kratzert | 425/392 |
| 3,768,949 | 10/1973 | Upmeier | 264/564 |
| 3,905,736 | 9/1975 | Bringman | 425/308 |

Primary Examiner—Maurice J. Welsh

[57] ABSTRACT

An improvement in plastic film formation devices which utilizes a unique cutting and take-off assembly. Flattening, cutting, and paired turning rod assembly move about the axis of the extruded tubular section of plastic in such a manner so as to continuously slice a helical section from the tubular extrusion. The mechanical arrangement of the flattening, cutting, and paired turning rod assembly provides for changing the pitch of the helix cut by changing the position of said assembly relative to the draw rollers.

This arrangement results in a simplified overall mechanical device which can randomize thickness variations across the width of sheets formed and also determine the width of said sheets. It also provides for more control of cooling air required to cool the extruded tube.

4 Claims, 6 Drawing Figures

TAKE-OFF APPARATUS FOR FORMED TUBULAR PLASTIC FILM

BACKGROUND

In the industry related to fabrication of thin plastic sheet several quality control problems can be reduced by the invention claimed herein. It is the current practice to extrude molten plastic through a die which is so constructed as to produce a tubular extrusion. The tubular extrusion is stretched and its walls made thin by varying methods, the most common of which is the application of air pressure within the tubular extrusion. All means of thinning the tube walls are considered equilavent for the purposes of this patent. This is performed as a continuous process and results in the formation of a tubular section. After cooling the tubular section, it is cut into two sections parallel to the tube axis and these sections are edge trimmed and put onto rolls for final market sale.

Current technology of die and cooling apparatus construction often results in a tubular section which has substantial thickness variations. These relative variations are more or less consistent when viewed over long sections of the tubular extrusion. Since a thick or thin section in the resulting sheet will result in a corresponding hill or valley on the final product roll which is not acceptable for most final uses of plastic sheets, various complex methods of obtaining distribution of the variations over the final roll have been developed. The most common are the rotation of the die or the rotation of the take-off assembly through 360°. Either method results in cutting strips in a helical path relative to the extruded tubular section. The major drawback of these systems is the complex machinery involved which is expensive and requires frequent maintenance.

This invention incorporates several improvements which improve the versatility and operation of the process and avoid the several drawbacks of the existing technology.

BRIEF SUMMARY OF THE INVENTION

This invention is an improvement in the method and apparatus used to form plastic film. A novel tube cutting and take-off apparatus allows the distribution of thickness variations in tubing across the width of two sheets created by flattening and cutting the tubing. The paired turning bars used to direct the sheets are coupled with the flattening and cutting devices and the entire assembly slowly oscillates through a small angle which results in the cutting of the tube following alternating helical paths. Adjustment of the angle formed by the paired turning rod assembly and the draw rollers can be used to determine the width of the sheets on the final rolls.

The invention will be described with reference to the accompanying diagrammatic drawings in which:

FIG. 1 is a simplied and elevation view of the apparatus;

FIG. 2 diagrammatically depicts elevation and plan views of the apparatus in three positions resulting in (A) no rotation of the tube, (B) rotation in the counterclockwise direction and (C) clockwise;

FIG. 3 is a simplified side view of the cutting assembly showing the longitudinal displacement of the sheets on the turning rods when the helix angle is other than 0°;

FIG. 4 diagrammatically depicts the change in width and speed of the sheet as a function of the helical cutting path angle;

Figure 1:
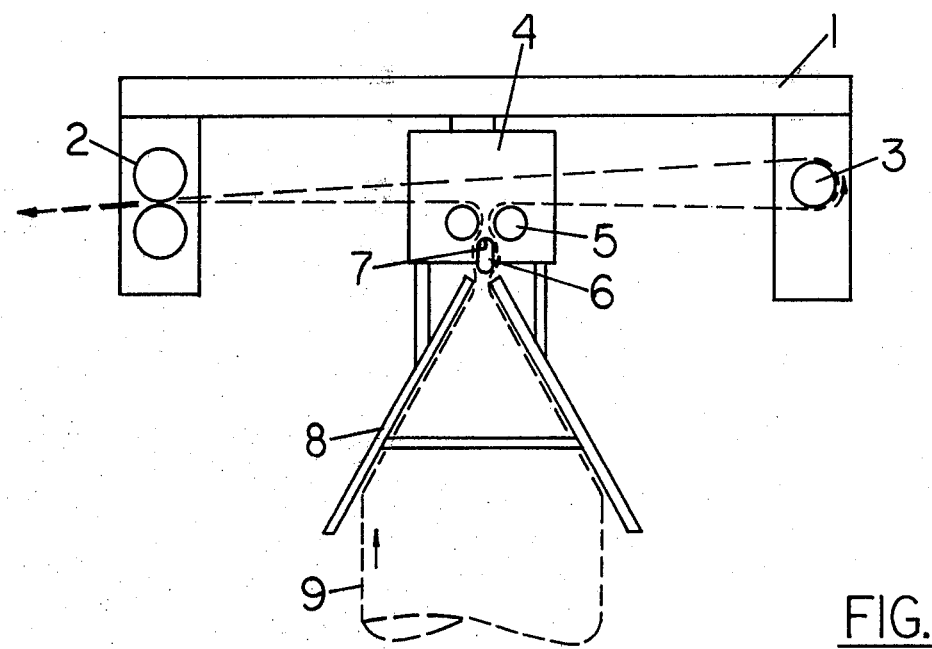

As shown in FIG. 1, the apparatus consists of a main frame 1. Mounted on the main frame is a pair of motor driven draw rollers 2. Also mounted on the main frame and parallel to the draw rollers is a free turning roller 3. A subframe 4 is pivotally mounted with its axis of rotation passing through a line connecting the midpoints of the free turning roller and one of the draw rollers. Mounted on the subframe are a pair of turning bars 5 whose axes are parallel and equidistant to the axis of rotation of the subframe and are in a plane perpendicular to the subframe's axis of rotation. The distance between the turning bars should be the minimum allowed by design constraints. A cutting assembly 6 of conventional design having swivelly mounted cutting blades 7 is mounted on the subframe in an orientation such that corresponding points on the assembly are equidistant from the turning bars and so that a flattened tube passing through the space between the turning bars, having a common axis with the subframe and entering from the side opposite to that of the main frame will be cut immediately before passing between the narrowest space between the turning bars. The distance between a line connecting the points on the cutting blades where cutting occurs and the axis of the turning bars should be the minimum allowed by design constraints. Also mounted on the subframe is a tube flattening plate 8 of conventional design oriented such that a tube 9 being flattened by it would have a common axis with the axis of rotation of the subframe. For the purposes of this invention, plates, rollers, internal spreader arms and similar flattening means are equivalent.

Distribution of thickness variations across the width of the finished rolls of material is achieved by causing the tubing to rotate about its axis alternately in clockwise and counter-clockwise directions as it is continuously formed. The resulting relative rotation provided between the tubing and the cutting assembly results in the tubing being cut into two sheets following a helical path.

Rotation is induced in the tubing when the subframe is positioned so that an acute angle is formed by the axis of the turning bars and the axis of the draw rollers and direction changing roller.

Figure 2:
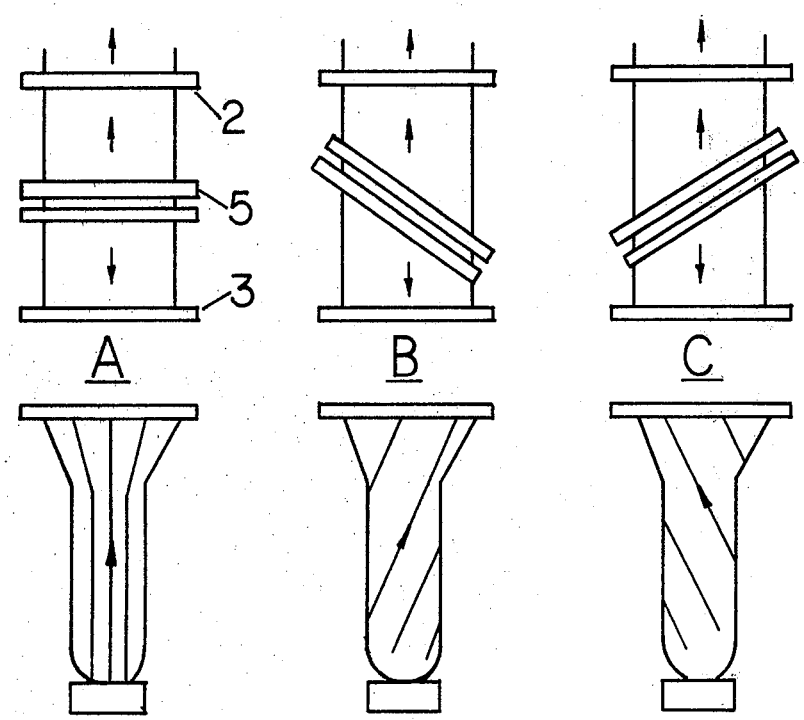

This causes the direction of the tensile force in the two formed sheets when deflected by the turning rods and transmitted through the sheet forming the tube to follow a helical path through the tube whose pitch is equal to the angle formed by the axis of the turning bars and fixed draw rollers. This can be seen in FIG. 2.

The positioning of the subframe at a small angle relative to its 0° reference position, parallel to the draw rollers, results in the rotation of the tubing through an angle many times the size of the subframe as it travels from die to cutting assembly. The physical parameters and their mathematical relationships for a fixed tube diameter are as follows:

$$R = H/C \, \text{Tan} \, \phi \times 360°$$

where:

R = Rotation of the tube in degrees as it travels distance H.
H = Distance from die to cutting assembly.
C = Circumference of the tube.
$\phi$ = Subframe angle.

This equation is presented for understanding the patent and assumes an inelastic material, therefore the actual relationships may vary.

The continuous distribution of thickness variations is achieved by slowly oscillating the subframe about its 0° position. To achieve complete distribution, the angle through which the subframe oscillates each cycle must result in the tubing rotating through 360°. Based on the parameters generally found in current practice, the angle of oscillation required for complete distribution would usually be less than 10° about either side of the 0° position. Control of sheet width may require a larger angular movement.

Figure 3:
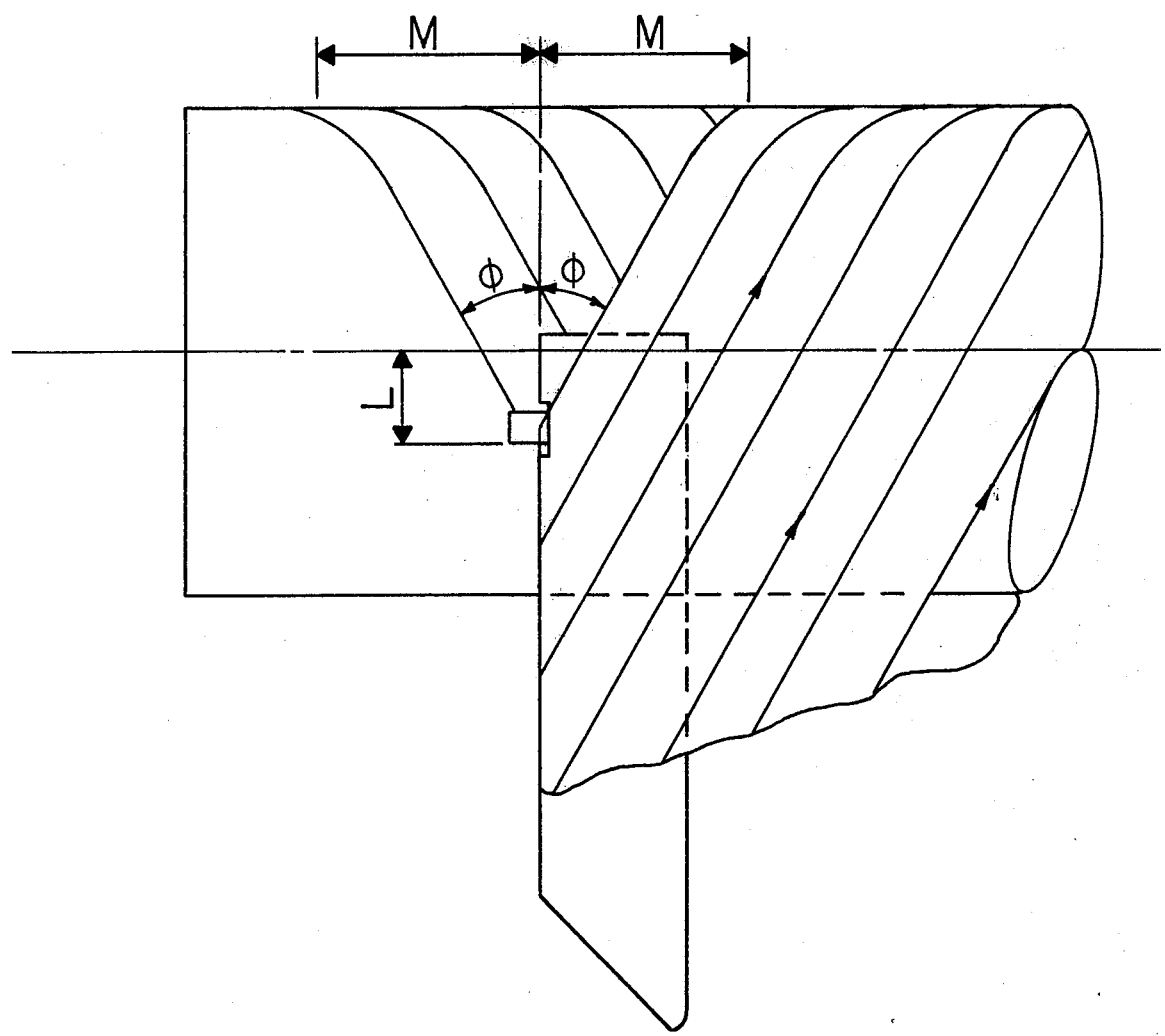
Figure 5:
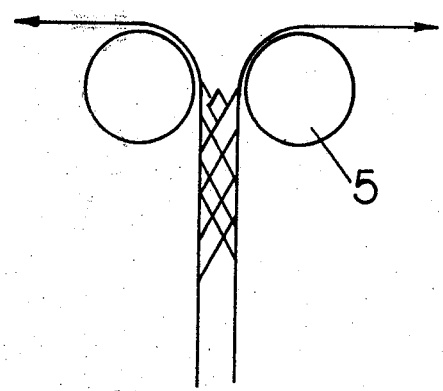
FIG. 5 is a simplified end view of the cutting assembly showing the swivelling cutting blade.

When the subframe angle is other than 0°, the positions of the sheets are displaced longitudinally on the turning rods. As seen in FIG. 3, the two sheets move in opposite directions. The directions change when the subframe angle is reversed. The physical parameters and their mathematical relationship is given by the formula:

$$M = (L + \tfrac{1}{2}C) \sin \phi$$

where:
M = movement of each sheet perpendicular to draw rollers from its 0° position.
L = Distance from the cutting edge of the slitter to the plane containing the axis of the turning rods.
C = Circumference of the turning rod.
$\phi$ = Subframe angle.

The size of the displacement of the sheets can be minimized by minimizing the distance, L, from the cutting edge of the blade to the plane containing the axes of the turning rods and by minimizing the diameter of the turning rods.

Figure 4:
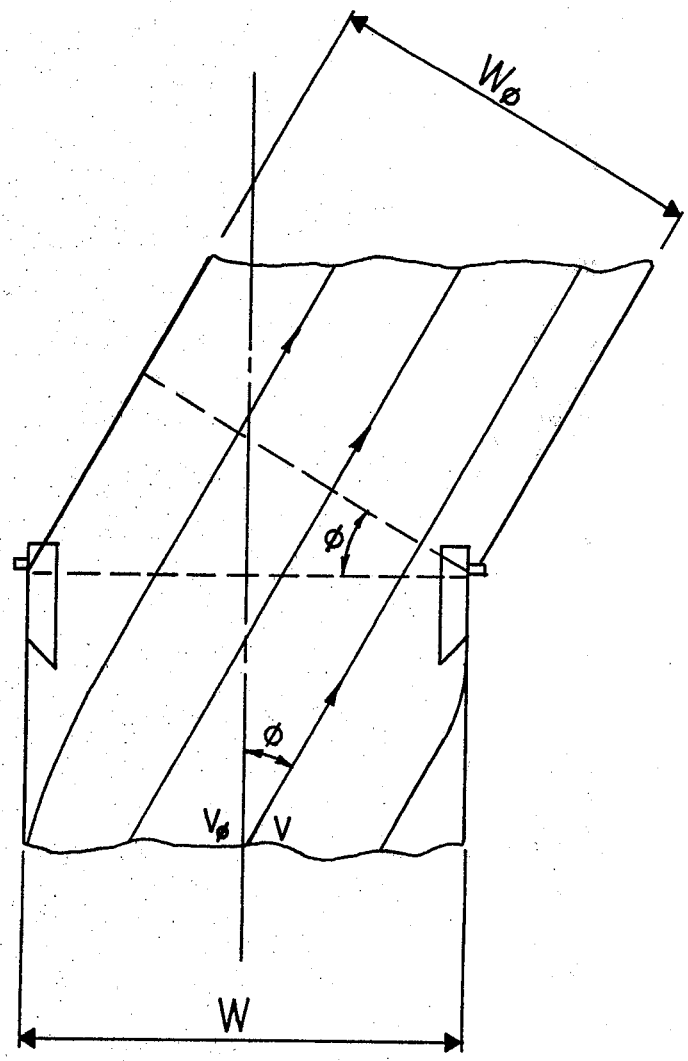

As seen in FIG. 4, when the subframe angle is other than 0°, the direction of the movement of points on the tube, as it is being cut, is no longer perpendicular to the line through the cutting edges as it is when the subframe angle is 0°. The angle formed is equal to the subframe angle. Thus, the approximate width of the sheet cut is equal to the distance between the cutting blades which is projected onto a line perpendicular to the direction of motion of the sheet as it is cut. The physical parameters and their mathematical relationship is given by the following formula:

$$W_\phi = W \cos \phi$$

where:
W = width of flattened tube.
$\phi$ = subframe angle.
$W_\phi$ = Width of sheet slit.

Along with the change in width of the sheets as a function of the subframe angle, the speed of the tube in the longitudinal direction also varies. This may also be seen in FIG. 4. The physical parameters and their mathematical relationship is given by the following formula:

$$V_\phi = V \cos = \text{Longetudinal speed of the tube.}$$

where:
V = Speed of the sheet.
$\phi$ = Subframe angle.

Both the variation in width of the sheet and the variation in the speed of the tube will be of minor significance, approximately ½-1%, based on a 10°-20° total angle of oscillation of the subframe, the velocity of the tube in the longetudinal direction can be maintained constant by adjusting the speed of the draw rollers.

Since the width of the sheet formed, when the tubing is cut, is a function of the subframe angle, the final width of sheet cut from a fixed diameter tube can be controlled over a limited range while still distributing thickness variations. This is accomplished by setting the reference angle, about which the subframe oscillates to achieve thickness distribution, to the appropriate angle needed to achieve the desired final width as determined by the previously given formula; $W_\phi = W \cos \phi$.

Figure 6:
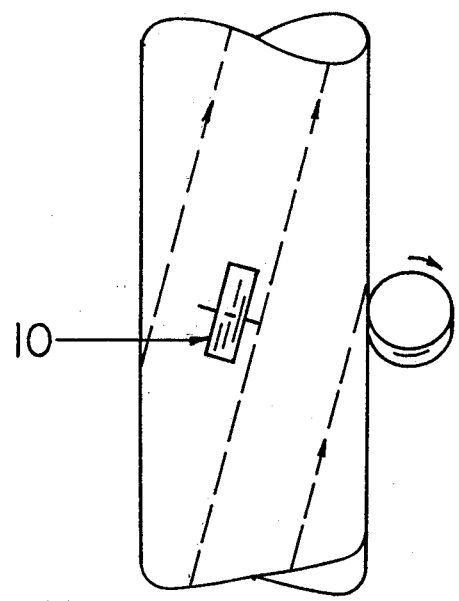
FIG. 6 is a means of inducing additional turning moment.

In some applications it is desirable to supply supplemental turning force and this can be accomplished by an apparatus as shown in FIG. 6. In this figure, wheel units (10) are used to apply a slight pressure to the surface of the tube. A connection means is connected to the turning bars so that the wheels follow the intended direction and rate of turning of the tube is augmented by the wheel units. Supplemental turning force can be applied both from inside or outside the tube.

Another advantage of this invention over some of the units in present use is the ability to transport air through the tube near the cutter. This allows use of less complicated die assemblies and allows finer control of die temperatures as well as better control of the transition zone of the plastic tube.

Having described the invention, I claim:

1. A cutting and take-off apparatus for handling formed tubing of plastic material extruded from a forming die comprising a main frame mounting means and thereon fastened:
   a reversingly rotatable sub-assembly having flattening means,
   a cutting assembly,
   paired turning rods, said sub-assembly adapted to be reversingly rotated through an angle about the axis of the extruded tubing,
   a means of collecting the two sheets of material, wherein the apparatus is assembled so that the formed tubing is collapsed by said flattening means and a cutting means is provided to but in a variable helical path about said longitudinal axis of said formed tubing resulting from a turning of said tubing about its longitudinal axis because of the induced tensil stresses imparted by the sub-assembly's rotations through an angle.

2. The invention of claim 1 wherein said similar members are internal spreader arms fastened to the die.

3. The invention of claim 1 wherein said angle about the axis is less than 25°.

4. The invention of claim 1 wherein said forming die is mounted to remain stationary relative to some fixed point outside of the apparatus.

* * * * *